Jan. 17, 1956   O. C. AKIN   2,731,049
SAW GUARD ASSEMBLY FOR ROTARY TABLE SAWS
Filed June 10, 1954
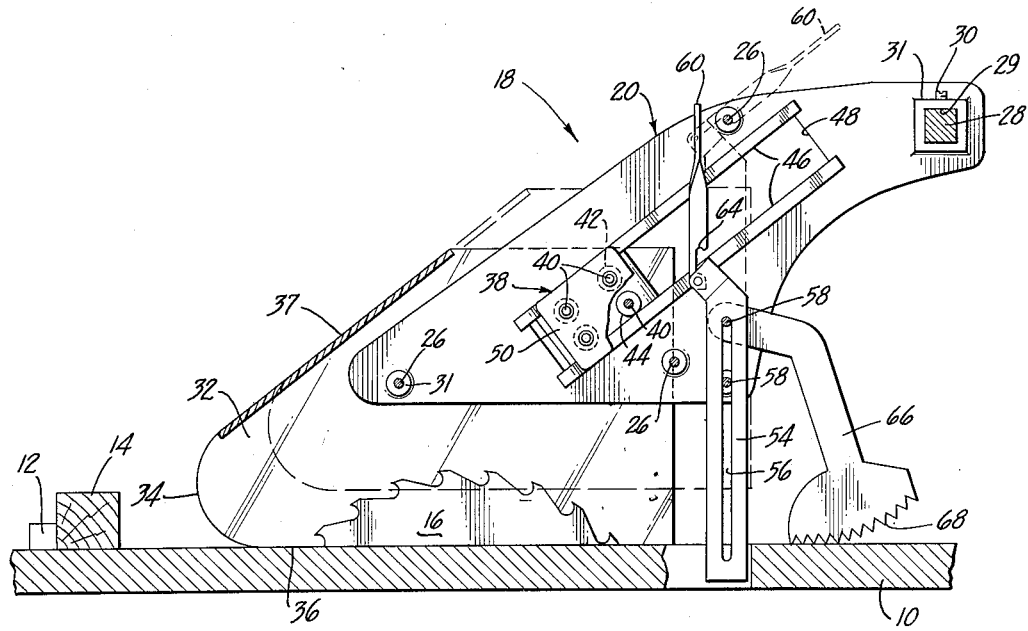
INVENTOR.
Orville C. Akin
BY George Sipkin
ATTORNEYS United States Patent Office 2,731,049
Patented Jan. 17, 1956

2,731,049

SAW GUARD ASSEMBLY FOR ROTARY TABLE SAWS

Orville C. Akin, Vallejo, Calif.

Application June 10, 1954, Serial No. 435,947

3 Claims. (Cl. 143—159)

(Granted under Title 35, U. S. Code (1952), sec. 266)

The invention may be manufactured and used by or for the Government of the United States of America for governmental purposes without the payment of any royalties thereon or therefor.

The value of rotary saw guards for protecting both personnel and equipment has been recognized for many years and, in fact, such a safety measure is required by most manufacturing shops and, in some instances, by state laws. Despite such regulations, many saw operators intentionally avoid the use of the presently available guards because, not only are they cumbersome and burdensome, but, also they are notoriously deficient in the protection offered.

Thus, in some of these prior art constructions the guards are formed of a hood pivotally mounted at one end on what is known as a splitter-type support which functions, as its name implies, to maintain a separation between the stock and trimmed portions. These types of guards offered several disadvantages, one being that the guard could not be rigidly supported over the saw table because the width of the splitter was limited to the width of the saw slot through which it must pass. Accordingly, the danger of the guard moving laterally in the path of the blade was always present. Another disadvantage lies in the specific manner in which the hoods sometimes are pivotally mounted. Thus, some of these hoods are mounted on a pin intended to slide in the splitter slot, and as the work piece is advanced under the guard, a drag is created between the pin and slot to the extent that additional effort on behalf of the operator is required to move the piece past the saw guard.

Also, in these and other guards the hood is of an integral construction and in a raised position one side of the saw is unprotected and presents a hazard to the operator when either the stock piece or trimmed piece is displaced from under the guard. Another danger arising from this construction is that the trimmed piece, particularly a small one, must be restrained by one hand of the operator; otherwise, it may be kicked by the saw and injure personnel in the vicinity. This effort leaves only one hand of the operator to move the stock while the other hand precariously restrains the trimmed piece.

Other hoods have been provided with slidable guard plates positioned on each side of the saw blade; although these guard plates are dependently connected and are movable rearwardly in unison by a tripping mechanism mounted on the saw table. Aside from the relatively complicated nature of this hood mechanism itself, its use on standard saws also requires extensive modification in the saw, and, of course, both these characteristics are undesirable.

A principal object of this invention is to provide a saw guard that requires a minimum effort to operate and offers a maximum protection.

Another object is to provide a saw guard capable of being operated automatically by the passage of a workpiece in such a manner that either side of the guard can be actuated independently of the other side.

A further object is to provide a saw guard that is simple and light weight in construction and capable of being easily installed without modification to the saw.

Still another object is to provide a saw guard that will offer the maximum visibility of the sawing operation.

These and other objects will become apparent from the following detailed description and the accompanying drawing.

According to the invention, the saw guard is formed of a hood having a pair of vertical side plates spaced apart to receive a saw blade. Each plate, in turn, is independently and freely movable in a stationary frame, and the movement preferably is along an upwardly inclined track so that each blade can retract independently when engaged by the workpiece leaving, when necessary, the other blade in its resting position in which it provides protection against injury from its side.

As would be expected, each plate is free to fall by the force of gravity so that removal of the stock or trimmed pieces from the one sides of the blade will permit the corresponding plate to return to its lower or normal sawguarding position. To permit the sawing operation to be under the observation of the operator at all times, the guard plates may be made of transparent sheet material.

When long workpieces are being sawed, it has been a conventional practice to use a splitter strip to maintain the separation of the stock and trimmed portions and, avoid a binding action on the saw. The saw guard of this invention is provided with a splitter strip which serves only this purpose and in no way acts as a guard support as in the prior art constructions. The splitter strip is mounted on the guard to be retractable from the path of the workpiece with means being provided for locking the splitter in the retracted position. Means also may be provided on the frame for preventing the workpiece from being kicked back to the operator in the event that the blade strikes a knot or other obstruction in the workpiece.

The preferred embodiment of the invention is illustrated in the accompanying drawings of which Fig. 1 is an end elevation of the saw guard suspended over a conventional rotary saw and Fig. 2 a partially-sectioned side elevation of the guard taken along line II—II of Fig. 1.

Referring to the drawings, reference numeral 10 designates a conventional saw table having a carriage 12 on which is positioned a workpiece 14, such as a piece of wood, for passage through a rotary saw blade 16.

The guard of this invention, generally indicated at 18, is particularly suitable for use with such a saw and, as seen, it is formed of a frame 20 provided with two vertical side sections 22 and 24 secured together in a spaced relationship by a plurality of pins 26. Frame 20 is suspended over the saw table by a horizontal arm 28 detachably secured in section openings 29 by set screws 30, arm 28 and corresponding openings 29 being non-circular to prevent rotation about the horizontal axis. The frame sections are provided with internal bosses 31 around the openings for arms 28 and pins 26 to insure adequate support.

Arm 28 extends from a lateral position beyond the path of the work piece and is supported by any conventional structure to the edge of the saw table, the floor, or the ceiling, whichever construction is most suitable for the particular installation, the notable part of this arrangement being that the supporting structure is adequately rigid and strong in that it is not limited to the width of the saw slot as is in the prior art which frequently uses its splitter or separator strip for a support. As will be noted later, a splitter may be provided in the guard to function solely in the capacity of a separator for the sawed pieces.

The operator is afforded protection from accidental contact with the saw blade by a pair of spaced vertical guard plates 32 and 33 independently suspended from and freely movable with respect to frame sections 22 and 24, respectively. Each guard plate is provided with a rounded lower front corner 34 adapted to be engaged by the workpiece and cammed upwardly as the workpiece is advanced by the operator into the saw blade, the bottom edge 36 of each plate being preferably horizontal for engaging a substantial portion of the workpiece surface at all times. As the guard plates are freely reciprocable in a vertical plane, the weight of the guard plates applies a pressure on the stock and its trimmed portions to maintain them in a parallel position with the blade until they are advanced or removed by the operator. This clamping action minimizes hazardous "kick-backs" of small trimmed pieces accidently displaced into the moving saw from either side and, also, it reduces the danger of flying splinters.

Another important advantage offered by guard plates having an independent vertical movement is that each plate automatically falls to the table to guard that side of the saw simultaneously with the removal of its supporting workpiece. Furthermore, each guard plate can be formed of a size to cover the saw when in both lowered and raised positions, this fact being illustrated in Fig. 2 by the solid line and broken lined positions, respectively. A window 37 may be marginally secured to the front edge of one guard plate for deflecting any flying particles directed toward the front end of the guard without restricting the independent plate movement.

In considering the foregoing advantages it should be noted that they are present regardless from which side of the saw the stock is trimmed by the operator, or, in other words, the operator is not required to use the saw from only one specified side in order for the guard to function since each guard plate operates in the same independent manner.

By a further feature of the invention each guard plate is reciprocably mounted on the frame in such a manner as to require force for its retraction, the preferred mounting comprising a carriage 38 secured by bolts 40 to the inner plate wall. These bolts in turn support a set of oppositely positioned rollers 42 and 44 adapted to engage rails 46 mounted on the opposing longitudinal edges of a slot 48 formed in each frame section. As illustrated, two sets of rollers may be provided to furnish additional support and to restrain the plate from rocking about a horizontal axis during reciprocation. Carriage 38 is confined within slot 48 by a retainer plate 50 which also can be secured in position by bolts 40.

Slots 48 are disposed obliquely in the frame and are rearwardly inclined to minimize the force required to lift the guard plates by the operator-propelled workpiece engaging the cam ends of the plates. If desired, the arrangement of the roller means could be reversed, that is, the slots could be formed in the guard plates and the roller carriages fixed to the frame; however, such a construction presents a disadvantage in that wood chips and dust may be discharged exteriorly of the hood through the slots, and further objects could be accidentally inserted through these slot openings.

As previously noted, it is desirable in certain sawing operations to use a splitter strip to maintain a separation of the sawed pieces, and in the present invention such a splitter is provided at 54. However, as the presence of a splitter is undesirable in other operations, such as in the sawing of small pieces, means are provided to permit the splitter to be retracted to an inoperative position. To accomplish this result, splitter 54 is formed with a vertical slot 56 through which are projected a plurality of guide pins 58 mounted on the frame. The splitter can be lifted out of the path of the workpiece to a retracted position shown by broken lines in Fig. 2 by a lever 60 accessible through the top of the frame. Means also is provided for locking the splitter in a retracted position, and such means may include a lever recess 64 adapted to engage one of the space pins 26 when the lever is lifted and pivoted.

If in a sawing operation the saw blade engages a wood knot or any other obstruction in the workpiece, there is a possibility that the workpiece may be thrown back with considerable force toward the operator. Obviously, such a kick-back is a hazard and, accordingly, its possibility presently is avoided by the provision of a pair of pawls 66, one each for the stock portion and the trimmed portion. The pawls preferably are pivoted on pins 58 and, most suitably, their hubs are thickened sufficiently to permit a lateral spacing substantially equal to the thickness of splitter 54, this spacing providing a guide for the splitter. The free end of each pawl extends rearwardly of the frame and terminates in an arcuate serrated portion 68 which is capable of riding over the workpiece to permit its advance under the guard, but which primarily functions to engage the workpiece if it is kicked back and thus prevents any resulting injury.

The operation of the guard is apparent from the drawing. As the workpiece is advanced into engagement with the guard, the guard plates are cammed rearwardly and upwardly with a minimum exertion by the operator. It is immaterial on which side of the saw blade the stock is positioned because of the vertical symmetry of the guard. If the width of the trimmed portion 69 illustrated in Fig. 1 is less than the spacing between the saw blade and the corresponding guard plate, the plate will remain in a lower position to prevent the operator's hands from accidently moving into the saw. If the stock portion and trim portion are wider than the above described spacing, as is usually the case, both plates will be raised simultaneously and, with their lower horizontal edges 36 resting flatly on both top surfaces of the stock and trimmed piece throughout their passage through the saw to restrain them from being deflected into the saw blade path. When either portion of the workpiece is removed from under the guard, the respective guard plate immediately drops to replace the removed portion and guard the saw. If it is desirous to use a splitter strip, lever 60 may be lifted to release splitter 54 from its locking pin. As each portion of the workpiece passes under the guard, pawls 68 insure that either portion cannot be kicked back to the operator by accidental engagement with the rotating blade. Another factor of considerable importance is that the construction and operation of the present guard permits it to be unusually rigidly supported over any saw table with very little, if any, required modification to the existing structure.

Obviously many modifications and variations of the present invention are possible in the light of the above teachings. It is therefore to be understood that within the scope of the appended claims the invention may be practiced otherwise than as specifically described.

I claim:

1. A saw guard assembly for use in association with a rotary table saw, comprising: a stationary frame supported above the saw blade; first and second vertical side guard plates spaced from one another to either side of said saw blade; means independently vertically reciprocably mounting each side guard plate to said frame with each said plate under force of gravity normally resting upon the table surface; the bottom leading edge of each side guard plate being rounded for upward camming engagement by a work-piece; a transparent front guard plate having a width sufficient to span the distance between said side guard plates; and means supporting said front guard plate generally toward the front and above the saw blade and in a position spanning the distance between but free from at least one of said side guard plates.

2. A saw guard assembly for use in association with a rotary table saw, comprising: a stationary frame supported above the saw blade; first and second vertical side guard plates spaced from one another to either side of said saw blade; means independently vertically reciprocably mounting each side guard plate to said frame with each said plate under force of gravity normally resting upon the table surface; the bottom leading edge of each side guard plate being rounded for upward camming engagement by a work-piece; said side guard plates defining parallel front edges inclined upwardly and rearwardly from the plane of the saw table; a transparent front guard plate having a width sufficient to span the distance between the said inclined parallel front edges of said side guard plates; and means supporting said front guard plate generally toward the front and above the saw blade, and in a position spanning the distance between and parallel to but free from at least one of said inclined front edges of said side guard plates.

3. A saw guard assembly for use in association with a rotary table saw, comprising: a stationary frame supported above the saw blade; first and second vertical side guard plates spaced from one another to either side of said saw blade; means independently vertically reciprocably mounting each side guard plate to said frame with each said plate under force of gravity normally resting upon the table surface; the bottom leading edge of each side guard plate being rounded for upward camming engagement by a work-piece; a transparent front guard plate having a width sufficient to span the distance between said side guard plates; said side guard plates defining parallel front edges inclined upwardly and rearwardly from the plane of the saw table; a transparent front guard plate having a width sufficient to span the distance between the said inclined parallel front edges of said side guard plates; said front guard plate attached along one of its edges to a said inclined front edge of said first side guard plate for vertical reciprocable movement therewith; said front guard plate spanning the distance between said side guard plates and with its unattached side edge disposed inwardly of, but closely adjacent, the inner face of said second side guard plate, whereby said second guard plate may vertically reciprocate independently of said first side guard plate and front guard plate attached thereto.

References Cited in the file of this patent

UNITED STATES PATENTS

| | | |
|---|---|---|
| 1,255,886 | Jones | Feb. 12, 1918 |
| 1,397,606 | Smith | Nov. 22, 1921 |
| 1,519,647 | Wetmore | Dec. 16, 1924 |
| 1,879,280 | James | Sept. 27, 1932 |
| 1,888,679 | Knapp | Nov. 22, 1932 |
| 2,466,325 | Ocenasek | Apr. 5, 1949 |